US006194505B1

(12) United States Patent
Sone et al.

(10) Patent No.: US 6,194,505 B1
(45) Date of Patent: Feb. 27, 2001

(54) RUBBER COMPOSITION FOR SOLID GOLF BALL AND SOLID GOLF BALL

(75) Inventors: Takuo Sone; Iwakazu Hattori, both of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/201,653

(22) Filed: Dec. 1, 1998

(30) Foreign Application Priority Data

Dec. 3, 1997 (JP) .................................................. 9-348660

(51) Int. Cl.⁷ .............................. A63B 37/06; C08K 3/22; C08L 9/00
(52) U.S. Cl. ...................... 524/432; 524/526; 524/534; 525/193; 525/274; 473/371; 473/372
(58) Field of Search ..................................... 524/432, 526, 524/534; 525/193, 274; 473/371, 372

(56) References Cited

U.S. PATENT DOCUMENTS

| 4,971,329 | * | 11/1990 | Llort . |
| 5,215,308 | * | 6/1993 | Hiraoka . |
| 5,844,050 | * | 12/1998 | Fukahori . |

FOREIGN PATENT DOCUMENTS

| 0 267 675 A2 | 5/1988 | (EP) . |
| 0 471 446 A1 | 2/1992 | (EP) . |
| 225138 | * 12/1983 | (JP) . |
| 58-225138 | 12/1983 | (JP) . |
| 05051406 | 3/1993 | (JP) . |
| 05059103 | 3/1993 | (JP) . |
| 06079018 | 3/1994 | (JP) . |
| 079018 | * 3/1994 | (JP) . |
| 07268132 | 10/1995 | (JP) . |
| 268132 | * 10/1995 | (JP) . |
| 08073515 | 3/1996 | (JP) . |

OTHER PUBLICATIONS

Derwent Abstract of J07268132, J02205105, J62089750, J58225138.

* cited by examiner

Primary Examiner—David J. Buttner
(74) Attorney, Agent, or Firm—Oblon, Spivak, McClelland, Maier & Neustadt, P.C.

(57) ABSTRACT

A rubber composition for solid golf balls comprising: (a) 50 to 100 parts by weight of a polybutadiene rubber with a 1,4-cis bond content of 80% or more, a 1,2-vinyl bond content of 2.0% or less, and a ratio (Mw/Mn) of the weight average molecular weight (Mw) and the number average molecular weight (Mn) of 3.5 or less, (b) 0 to 50 parts by weight of a diene-type rubber other than the component(a), provided that the total amount of the component (a) and component (b) is 100 parts by weight, (c) 10 to 50 parts by weight of a cross-linking monomer, (d) 20 to 80 part by weight of inorganic filler, and (e) an effective amount of an organic peroxide. The solid golf balls prepared from the rubber composition provide a good shot feeling, run a long distance, and exhibit superior durability.

8 Claims, 3 Drawing Sheets

RUBBER COMPOSITION FOR SOLID GOLF BALL AND SOLID GOLF BALL

BACKGROUND OF THE INVENTION

1. Field of the Invention

The present invention relates to a rubber composition for solid golf balls and to the solid golf balls produced from the composition. More specifically, the present invention relates to a rubber composition which can produce solid golf balls with a good shot feeling, a long shot distance, and superior durability, and to the solid golf balls prepared from the rubber composition.

2. Description of Background Art

There are one-piece solid golf balls and multi-piece solid golf balls. One-piece solid golf balls are made from a rubber composition integrally molded by cross-linking. Multi-piece solid golf balls comprise a solid core made from a hard cross-linking rubber composition enclosed by a cover. The solid core may be one integral core or may comprise two or more layers of cross-linked rubber compositions. There are two-piece, three-piece, and four-piece multi piece solid golf balls according to the type of core structure.

These multi piece solid golf balls are more popular and currently used at many golf courses due to the long shot distance.

A drawback of the multi piece solid golf ball is an unfavorable hard shot feeling as compared with conventional golf balls with tightly wound threads wrapped around a solid rubber core.

One proposal to improve the shot feeling of multi piece solid golf balls was to make the center core material softer than the outer portion to increase the distortion of the ball when hit by a club. However, a soft core lessens rebound, impairs durability, and decreases the shot distance.

Development of multi-piece solid golf balls with a favorable shot feeling, a long shot distance, and superior durability has therefore been desired.

On the other hand, one-piece solid golf balls are mainly used for training. Because repeated use damages the golf ball, sufficient durability to prevent such damage is desired. In addition, a favorable shot feeling is also demanded by golf trainees.

An object of the present invention is therefore to provide a rubber composition for multi-piece solid golf balls which can travel a long distance, exhibit superior durability, and provide a good shot feeling.

Another object of the present invention is to provide a rubber composition which can produce one-piece solid golf balls imparting improved shot feeling and exhibiting superior durability.

Still another object of the present invention is to provide multi-piece solid golf balls with improved shot distance, durability, and shot feeling.

A further object of the present invention is to provide one-piece solid golf balls with improved durability and shot feeling.

SUMMARY OF THE INVENTION

The above object is attained in the present invention by the provision of a rubber composition for solid golf balls comprising the following components (a), (b), (c), (d), and (e):

(a) 50 to 100 parts by weight of a polybutadiene rubber with a 1,4-cis bond content of 80% or more, a 1,2-vinyl bond content of 2.0% or less, and a ratio (Mw/Mn) of the weight average molecular weight (Mw) and the number average molecular weight (Mn) of 3.5 or less, (b) 0 to 50 parts by weight of a diene-type rubber other than the component (a), provided that the total amount of the component (a) and component (b) is 100 parts by weight, (c) 10 to 50 parts by weight of a cross-linking monomer, (d) 20 to 80 part by weight of inorganic filler, and (e) an effective amount of an organic peroxide.

In a preferred embodiment of the present invention, the ratio (Mw/Mn) of the weight average molecular weight (Mw) and the number average molecular weight (Mn) is 3.0 or less.

In another preferred embodiment of the present invention, the component (a) in the above rubber composition is a polybutadiene rubber produced by polymerization using a rare earth catalyst.

In another preferred embodiment of the present invention, the component (a) in the above rubber composition is a modified polybutadiene rubber produced by polymerizing butadiene in the presence of a rare earth catalyst and reacting the resulting polymer with a terminal modification agent.

In the above preferred embodiment, the terminal modification agent is at least one compound selected from the group consisting of:

(E) halogenated organometallic compounds, halogeno metallic compounds, or organometallic compounds represented by the following formulas:

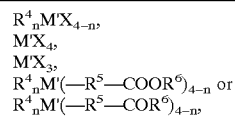

wherein $R^4$ and $R^5$ individually represent a hydrocarbon group containing 1–20 carbon atoms, $R^6$ is a hydrocarbon group containing 1–20 carbon atoms which may contain a carbonyl group or ester group in side chains, M' is a tin atom, silicon atom, germanium atom, or phosphorus atom, X is a halogen atom, and n is integer from 0 to 3;

(F) hetero cumulene compounds having a Y=C=Z bond in the molecule, wherein Y is a carbon atom, oxygen atom, nitrogen atom, or sulfur atom, and Z is an oxygen atom, nitrogen atom, or sulfur atom;

(G) 3 member heterocyclic compounds having the following bond in the molecule:

wherein Y is an oxygen atom, nitrogen atom, or sulfur atom;

(H) halogenated iso-cyano compounds;

(I) carboxylic acids, acid halides, ester compounds, carbonate compounds, or acid anhydrides represented by the following formulas:

R⁷——(COOH)ₘ,

R⁸(COX)ₘ,

R⁹——(COO——R¹⁰),

R¹¹——OCOO——R¹²,

R¹³——(COOCO——R¹⁴)ₘ, or

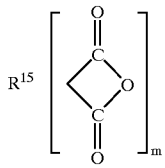

wherein $R^7$ to $R^{15}$ individually represent a hydrocarbon group containing 1–50 carbon atoms, X indicates a halogen atom, and m is an integer from 1 to 5; and (J) Metal salts of carboxylic acid represented by the following formulas:

$R_l^{16}M''(OCOR^{17})_{4-1}$, $R_l^{18}M''(OCO-\!\!-R^{19}-\!\!-COOR^{20})_{4-1}$, or

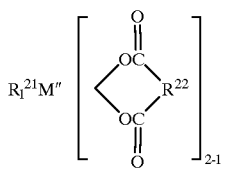

wherein $R^{16}$ to $R^{22}$ individually represent a hydrocarbon group having 1–20 carbon atoms, M" indicates a tin atom, silicon atom, or germanium atom, and 1 is an integer from 1 to 3.

In still another preferred embodiment of the present invention, the component (a) in the above rubber composition is a polybutadiene rubber or a modified polybutadiene rubber produced by polymerization using a catalyst comprising a rare earth catalyst and an almoxane compound.

In the above preferred embodiment the rare earth catalyst is a lanthanum series rare earth catalyst.

In the preferred embodiment described just above, the lanthanum series rare earth catalyst is a neodymium based catalyst.

The above object is further attained in the present invention by the provision of solid golf balls for which the whole or part of the rubbery material is produced by cross-linking and molding any one of the above-mentioned rubber compositions.

Other objects, features and advantages of the invention will hereinafter become more readily apparent from the following description.

DETAILED DESCRIPTION OF THE INVENTION AND PREFERRED EMBODIMENTS

Figure 1:
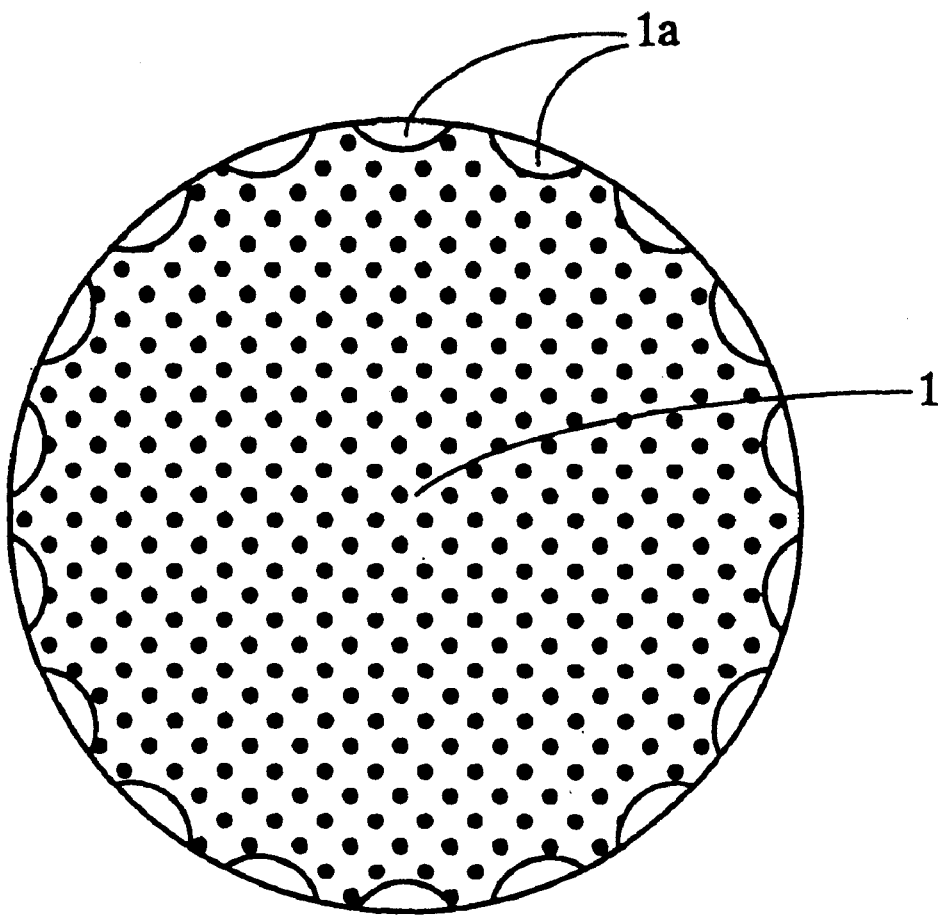
FIG. 1 is a schematic cross-sectional view of an embodiment of a one-piece solid golf ball of the present invention.

The component (a) of the rubber composition for solid golf balls of the present invention will be described first.

The polybutadiene rubber for the component (a) has a 1,4-cis bond content of 80% or more, preferably 90% or more, a 1,2-vinyl bond content of 2.0% or less, preferably 1.5% or less, and a ratio (Mw/Mn) of the weight average molecular weight (Mw) and the number average molecular weight (Mn) of 3.5 or less, preferably 3.0 or less, and more preferably 2.5 or less.

In addition, it is desirable that the component (a) have a Mooney viscosity $ML_{1+4}$ (100° C.) in the range from 20 to 140, and preferably from 30 to 100.

The use of the polybutadiene rubber with a large 1,4-cis bond content and a narrow molecular weight distribution as a major rubber component ensures that the solid golf balls comprising the rubber material made from the rubber composition of the present invention by cross-link molding have a long shot run distance, impart a good shot feeling, and exhibit superior durability.

The polybutadiene rubber for the component (a) can be prepared by the polymerization of butadiene in the presence of a rare earth catalyst. A modified polybutadiene rubber prepared from the above polybutadiene rubber by modifying the terminals using a terminal modification agent immediately after the polymerization can also be used. In the descriptions below, the polybutadiene rubber obtained by the polymerization of butadiene in the presence of a rare earth catalyst is called "(a-1) unmodified polybutadiene rubber" and the polybutadiene rubber obtained by the subsequent reaction using a terminal modification agent is called "(a-2) modified polybutadiene rubber".

Although the unmodified polybutadiene rubber (a-1) and the modified polybutadiene rubber (a-2) may be used either individually or in combination, the use of the modified polybutadiene rubber is desirable in view of ensuring excellent storage stability.

Rare earth catalysts known in the art can be used for the polymerization of butadiene. For example, a lanthanum series rare earth compound is used, optionally, in combination with an organic aluminum compound, an almoxane compound, a halogen-containing compound, or a Lewis base.

As the lanthanum series rare earth compound, a metal halide, carboxylate, alcoholate, thioalcoholate, amide, α,β-diketone complex, phosphate, phosphite, or the like of a metal of an atomic number from 57 to 71, for example, neodymium, praseodymium, cerium, lanthanum, gadolinium, and the like, can be used.

As the organic aluminum compound, a compound represented by the formula $AlR^1R^2R^3$ (wherein $R^1$, $R^2$, and $R^3$ individually represent a hydrogen atom or a hydrocarbon group with 1–8 carbon atoms) can be used.

An almoxane is a compound having the structure shown by the following formula (I) or (II).

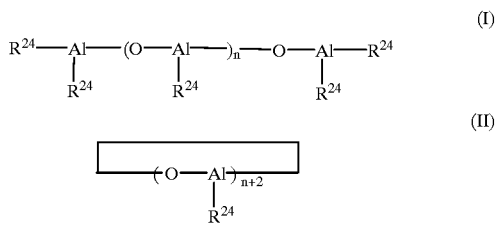

wherein $R^{24}$ individually represents a hydrocarbon group having 1–20 carbon atoms and n is an integer of 2 or more.

Almoxane agglomerates (Fine Chemical, 23, (9), 5 (1994), J. Am. Chem. Soc., 115, 4971 (1993), J. Am. Chem. Soc., 117, 6465 (1995) can also be used.

As the halogen-containing compound, metal halides such as an aluminum halide represented by $AlX_nR_{3-n}$ (wherein X is a halogen atom, R represents a hydrocarbon group having 1–20 carbon atoms, for example, an alkyl group, aryl group, or aralkyl group, and n is 1, 1.5, 2, or 3), a strontium halide such as trimethyl strontium chloride, dimethyl strontium dichloride, methyl strontium hydrodichloride, or methyl strontium trichloride, silicon tetrachloride, tin tetrachloride, titanium tetrachloride, zinc chloride, magnesium chloride, and the like can be used.

A Lewis base is used to produce a complex of lanthanum series rare earth compound. Acetylacetone, keto-alcohol, and the like can be suitably used as the Lewis base.

Of the above compounds, a neodymium-type catalyst using a neodymium compound as the lanthanum series rare earth compound is preferable, because such a catalyst exhibits superior polymerization activity, producing a polybutadiene rubber with a high 1,4-cis bond content and a low 1,2-vinyl bond content.

Specific examples of these rare earth metal catalysts are described in Japanese Patent Application No.9-203932, Japanese Patent Application No.10-59098, and European Patent Publication EP 0863165 A1 filed by the inventors of the present invention. All rare earth metal catalysts described in the specifications can be used.

When butadiene is polymerized in the presence of a lanthanum series rare earth catalyst (La compound), the molar ratio of butadiene/La compound should preferably be in the range from 1,000 to 2,000,000, more preferably from 5,000 to 1,000,000, to produce a butadiene rubber with the cis content and the Mw/Mn ratio in the above-mentioned range. In addition, the mole ratio of the $AlR^1R^2R^3$/La compound should preferably be in the range from 1 to 1,000, and more preferably from 3 to 500. In addition, the molar ratio of the halogen-containing compound/La compound is preferably in the range from 0.1 to 300, more preferably from 0.2 to 15. The molar ratio of the Lewis base/La compound is preferably from 0 to 30, and more preferably from 1 to 10.

The polymerization can be carried out in the presence of a solvent. Alternatively, bulk polymerization or vapor phase polymerization can be used without using a solvent. The polymerization temperature is usually in the range from –30° C. to 150° C., and preferably from 10 to 100° C., under a gauge pressure from 0 to 5 MPa, and preferably from 0 to 3 MPa.

The modified polybutadiene rubber (a-2) can be obtained by reacting the polymer with a terminal modification continuously after the polymerization.

The terminal modification agents are known per se in the art. The following compounds (E) to (J) can be given as examples.

(E) Halogenated organometallic compounds, halogeno metallic compounds, or organometallic compounds of the following formulas:

$$R^4_nM'X_{4-n},$$
$$M'X_4,$$
$$M'X_3,$$
$$R^4_nM'(-R^5-COOR^6)_{4-n} \text{ or}$$
$$R^4_nM'(-R^5-COR^6)_{4-n},$$

wherein $R^4$ and $R^5$ individually represent a hydrocarbon group containing 1–20 carbon atoms, $R^6$ is a hydrocarbon group containing 1–20 carbon atoms which may contain a carbonyl group or ester group in side chains, M' is a tin atom, silicon atom, germanium atom, or phosphorus atom, X is a halogen atom, and n is integer from 0 to 3.

(F) Hetero cumulene compounds having a Y=C=Z bond in the molecule, wherein Y is a carbon atom, oxygen atom, nitrogen atom, or sulfur atom, and Z is an oxygen atom, nitrogen atom, or sulfur atom.

(G) 3 member heterocyclic compounds having the following bond in the molecule:

wherein Y is an oxygen atom, nitrogen atom, or sulfur atom.

(H) Halogenated iso-cyano compounds.

(I) Carboxylic acids, acid halides, ester compounds, carbonate compounds, or acid anhydrides with the following formulas:

$$R^7-(COOH)_m,$$
$$R^8(COX)_m,$$
$$R^9-(COO-R^{10}),$$
$$R^{11}-OCOO-R^{12},$$
$$R^{13}-(COOCO-R^{14})_m, \text{ or}$$

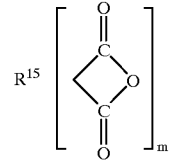

wherein $R^7$ to $R^{15}$ individually represent a hydrocarbon group containing 1–50 carbon atoms, X indicates a halogen atom, and m is an integer from 1 to 5.

(J) Metal salts of carboxylic acid represented by the following formulas:

$$R_l^{16}M''(OCOR^{17})_{4-l},$$
$$R_l^{18}M''(OCO-R^{19}-COOR^{20})_{4-l}, \text{ or}$$

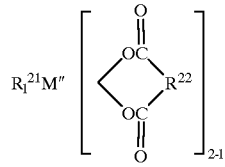

wherein $R^{16}$ to $R^{22}$ individually represent a hydrocarbon group having 1–20 carbon atoms, M" indicates a tin atom, silicon atom, or germanium atom, and l is an integer from 1 to 3.

Among these, the terminal modification agents (E), (F), and (J) are preferred. The above terminal modification agents (E) to (J) may be used either individually or in combinations of two or more.

Specific examples of the above terminal modification agents (E) to (J) are described in Japanese Patent Application No.9-203932, Japanese Patent Application No.10-59098, and European Patent Publication EP 0863165 A1 filed by the inventors of the present invention.

The reaction using these terminal modification agents can be carried out according to a method known in the art. For example, the methods described in Japanese Patent Application No. 9-65607 or Japanese Patent Application Laid-open No. 7-268132 by the inventors of the present invention can be used.

The diene-type rubbers for the component (b), which are rubbers other than the above-mentioned component (a) will now be described.

The component (b) is not an essential component-for rubber composition of the present invention, but a component which can be optionally added to an extent which does not impair the object of the present invention.

As specific examples of the component (b), modified or unmodified polybutadiene rubbers having a cis content of 80% or less and a ratio Mw/Mn of more than 3.5, styrene-butadiene rubbers (SBR), natural rubbers, synthetic polyisoprene rubbers, ethylene propylene diene rubbers (EPDM), and the like can be given. These rubbers may be used either individually or in combinations of two or more.

Next, cross-linking monomers for the component (C) will be described.

The cross-linking monomer (C) not only polymerizes itself by radicals produced by an organic peroxide (e) mentioned below which functions as a radical initiator, but also promotes the cross-linking reactions of the above-mentioned component (a) and component (b).

The cross-linking monomer added to the rubber composition of the present invention is preferably a monovalent or divalent metal salt of $\alpha,\beta$-ethylenically unsaturated carboxylic acid. The following compounds are given as specific examples.

(i) Unsaturated acids such as acrylic acid, methacrylic acid, itaconic acid, maleic acid, fumaric acid, crotonic acid, sorbic acid, tiglic acid, cinnamic acid, and aconitic acid. These unsaturated acids may be used either individually or in combinations of two or more.

(ii) Salts of Zn, Ca, Mg, Ba, or Na of the above unsaturated acids (i). These salts may be used either individually or in combinations of two or more.

Combinations of the above unsaturated acids (i) and the above metal salts (ii) can also be used.

In addition to the method of blending the metal salt of $\alpha,\beta$-ethylenically unsaturated carboxylic acid with the rubber base materials as is, it is possible to add an $\alpha,\beta$-ethylenically unsaturated carboxylic acid such as acrylic acid or methacrylic acid to a rubber composition which is previously mixed and kneaded with a metal oxide such as zinc oxide, and to react $\alpha,\beta$-ethylenically unsaturated carboxylic acid and the metal oxide, thereby producing the metal salt of $\alpha,\beta$-ethylenically unsaturated carboxylic acidd in the mixture. These cross-linking monomers (c) may be used either individually or in combinations of two or more.

Next, the inorganic fillers which are used as the component (d) of the present invention are described.

The inorganic fillers (d) are used to reinforce the cross-linking rubber and to increase its strength. In addition, the weight of solid golf balls can be adjusted according to the proportion of the component (d) added to the composition.

As specific examples of inorganic fillers, zinc oxide, barium sulfate, silica, alumina, aluminum sulfate, calcium carbonate, aluminum silicate, magnesium silicate, and the like can be given. Of these, zinc oxide, barium sulfate, and silica are preferable.

These inorganic fillers may be used either individually or in combinations of two or more.

The organic peroxide which is the component (e) of the present invention will now be described.

The organic peroxide is added to the rubber composition of the present invention as an initiator for the reactions such as a cross-linking reaction, graft reaction, and polymerization reaction of the rubber components which comprise the component (a) and component (b), and cross-linking monomers of the component (c).

As specific examples of the organic peroxides, dicumyl peroxide, 1,1-bis(t-butylperoxy)-3,3,5-trimethylcyclohexane, 2,5-dimethyl-2,5-di-(t-butylperoxy) hexane, and 1,3-bis(t-butylperoxyisopropyl) benzene can be given.

The components (a) to (e) are used in the following proportions in the rubber composition of the present invention.

(a) Unmodified or modified polybutadiene rubber:
50–100 parts by weight, preferably 50–90 parts by weight
(b) Diene-type rubber other than the component (a):
0–50 parts by weight, preferably 10–50 parts by weight, provided the total amount of the component (a) and the component (b) is 100 parts by weight.
(c) Cross-linking monomer:
10–50 parts by weight, preferably 10–40 parts by weight
(d) Inorganic filler:
20–80 parts by weight, preferably 20–70 parts by weight
(e) Organic peroxide:
Preferably 0.1–6 parts by weight, more preferably 0.2–5 parts by weight The proportion of the above components (a) to (e) in the above ranges ensures that the solid golf balls prepared from the rubber composition of the present invention have a long shot run distance, impart a good shot feeling, and exhibit superior durability. Although the mechanism is not necessarily completely clear, there is a tendency for a narrow molecular weight distribution of polybutadiene rubber to increase the shot distance, a lower 1,2-vinyl content to improve the durability, and the capability of modified polybutadiene rubber to disperse inorganic fillers to improve the shot feeling. In this respect, a polybutadiene rubber produced by polymerization using a neodymium-based catalyst and an almoxane is preferable, because, not only does such a polybutadiene rubber have a narrow molecular weight distribution, but also the rubber is greatly reinforced with an inorganic filler if its terminal is modified with a terminal modification agent. The resulting golf ball has a long shot distance. In addition, the polybutadiene rubber produced using a neodymium-based catalyst has a low 1,2-vinyl content and increased reinforcability, resulting in a golf ball with improved durability. Furthermore, the increased capability of this rubber to disperse inorganic fillers results in a golf ball with an improved shot feeling.

In addition to the above components (a) to (e), cross-linking adjuvants such as zinc oxide, lubricants such as stearic acid, antioxidants, and the like may be added to the rubber composition of the present invention.

Typical embodiments of solid golf balls which are prepared by cross-linking and fabricating the rubber composition of the present invention will now be described referring to the drawings.

FIG. 1 is a schematic cross-sectional view of a two-piece solid golf ball, which comprises a main body 1 and dimples 1a. The main body 1 is made from a rubbery material (specifically, a cross-linked molded article prepared from the rubber composition of the present invention).

Figure 2:
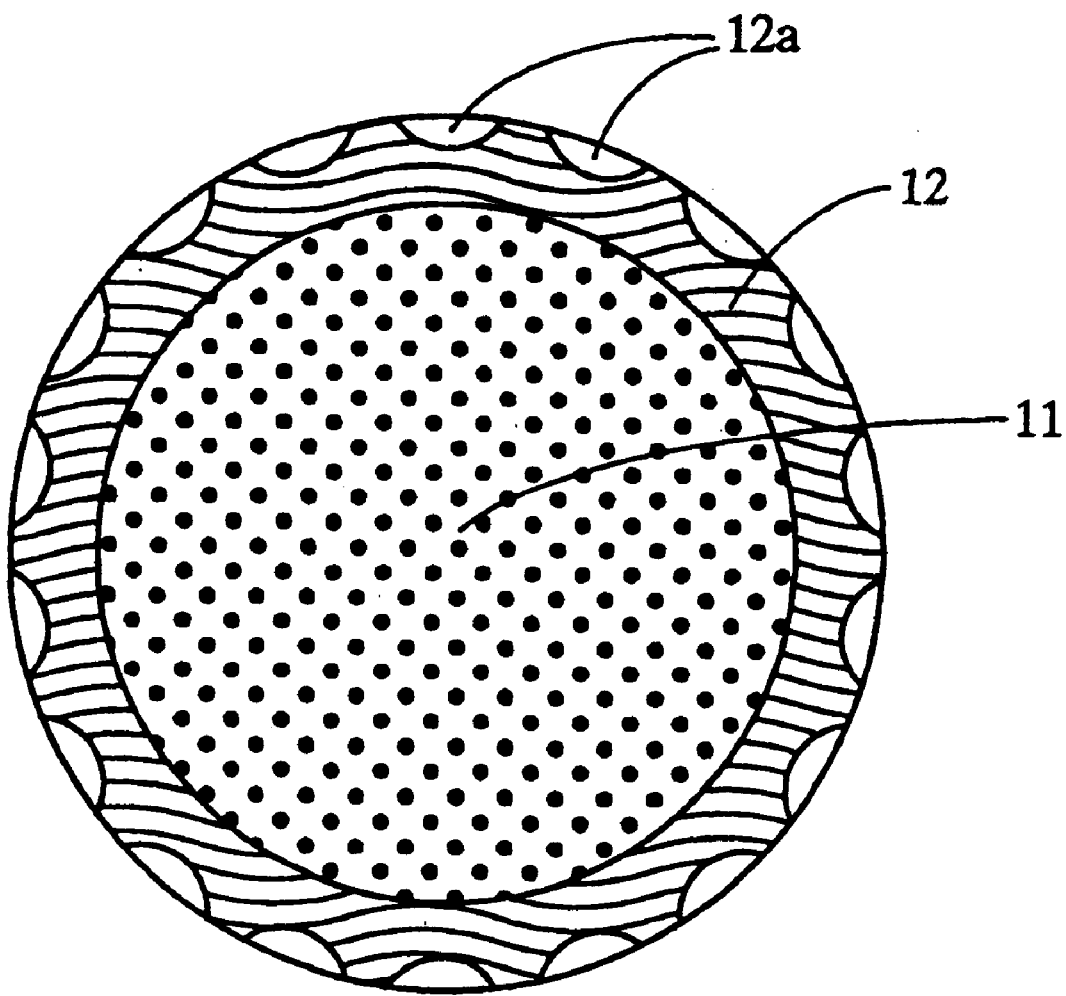
FIG. 2 is a schematic cross-sectional view of an embodiment of a two-piece solid golf ball of the present invention.

FIG. 2 is schematic cross-sectional view of a two-piece solid golf ball, which comprises a core 11 and a cover 12 which encloses the core 1. Dimples 12a are provided on the cover 12. The core 11 is made from a rubbery material.

Figure 3:
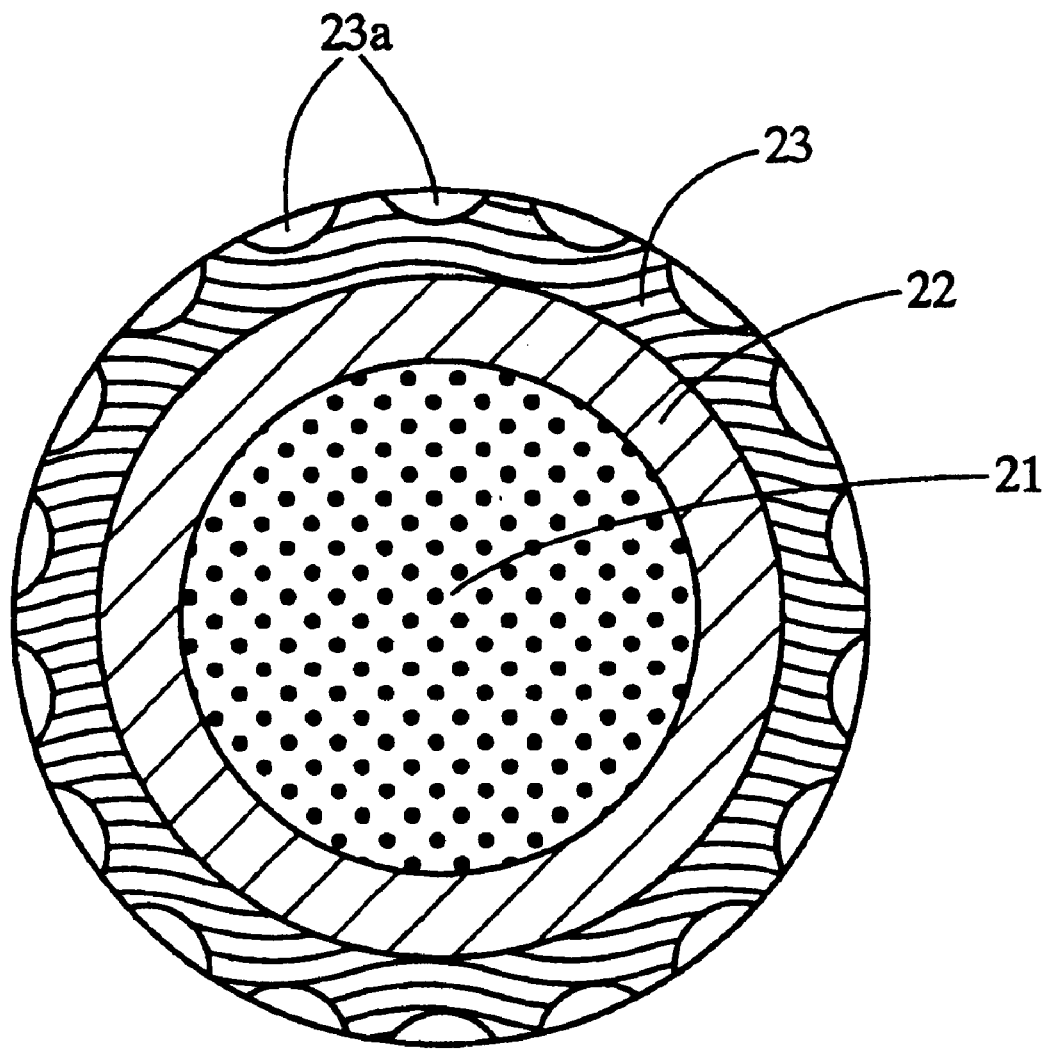
FIG. 3 is a schematic cross-sectional view of an embodiment of a three-piece solid golf ball of the present invention.

FIG. 3 is a schematic cross-sectional view of a three-piece solid golf ball, which comprises an inner core 21, an outer core 22, and a cover 23. Dimples 23a are provided on the cover 23. The inner core 21 and the outer core 22 form the solid core for the three-piece solid golf ball.

The inner core 21 and the outer core 22 are made from a rubbery material.

The outer core 22 of three-piece solid golf balls preferably has a density greater than the density of the inner core 21 to ensure a long shot distance and a high speed of rotation of the balls, for instance, by using a filler with a large specific gravity such as $W_2O_5$ for the outer core 22 and another filler with a smaller specific gravity such as $ZnO_2$ for the inner core 21.

Next, the method for preparing solid golf balls using the rubber composition of the present invention will be described.

First, the main body of one-piece solid golf balls, the core for two-piece solid golf balls, and the inner and outer cores for three-piece solid golf balls are fabricated by press-molding, wherein the rubber composition of the present invention is placed in respective molds and a cross-linking reaction is carried out at a temperature from 130 to 180° C. for 10 to 50 minutes. The temperature may be changed two steps or more during the cross-linking molding operation.

A three-piece solid golf ball is prepared by causing a sheet of the rubber composition for outer core of a desired thickness to adhere to the exterior of the inner core prepared in the above operation and cross-linking the outer core rubber composition by press molding, thereby obtaining a two-layer solid core.

At least one of the outer core or inner core of the three-piece solid golf ball must be made from the rubber composition of the present invention. It is ideal that both outer and inner cores be made from the rubber composition of the present invention.

The cover for the two-piece solid golf balls and three-piece solid golf balls is made by covering the cores with a composition comprising a resin such as an ionomer as a major component and other optional components such as an inorganic white pigment (e.g. titanium dioxide), a photo-stabilizer, and the like. The covering operation is carried out usually by injection molding, but not necessarily limited to this.

Dimples with a desired pattern are optionally provided during fabrication of the main body for one-piece solid golf balls, or during formation of the cover for two-piece solid golf balls or three-piece solid golf balls.

Four-piece solid golf balls can also be fabricated using the rubber composition of the present invention in the same manner as the three-piece solid golf balls.

This invention is explained in more detail below referring to embodiment examples; however, this invention should not be construed to be limited therein.

EXAMPLES

Synthetic Examples (Preparation of modified or unmodified polybutadiene rubber)

Synthetic Example 1

(Preparation of modified polybutadiene rubber (A) (HPB (A))

A 5 litter autoclave with the internal atmosphere replaced with nitrogen was charged with 2.5 kg of cyclohexane and 300 g of 1,3-butadiene. To the mixture was added a catalyst which was prepared by mixing a cyclohexane solution containing neodymium octanoate (0.18 mmol) and acetylacetone (0.37 mmol), a toluene solution of methyl almoxane (18.5 mmol), a cyclohexane solution of hydrogenated diisobutyl aluminum (3.9 mmol), and a cyclohexane solution of diethyl aluminum chloride (0.370 mmol), and reacting the mixture with 1,3-butadiene in an amount 5 times the amount of the neodymium, followed by aging for 30 minutes at 25° C. The polymerization reaction was carried out for 30 minutes at 50° C. The conversion rate of 1,3-butadiene was about 100%. Then, dioctyl tin bisoctylmaleate (5.40 mmol) was added while maintaining the temperature of the polymer solution at 50° C. The resulting mixture was allowed to stand for 30 minutes, followed by the addition of a methanol solution containing 1.5 g of 2,4 -di-t-butyl-p-cresol to terminate the polymerization reaction. The solvent was removed by steam stripping and the polymer was dried using a roller mill at 110° C. The polymer had Mooney viscosity ($ML_{1+4}$, 100° C.) of 45, a cis-1 4-bond content of 97.8%, a 1,2-vinyl bond content of 1.0%, and the ratio Mw/Mn of 2.1.

Modified polybutadiene rubbers (B), (C), and (E) (hereinafter called HPB (B), HPB (C), and HPB (E), respectively) were prepared in the same manner as in the Synthetic Example 1, except for using different terminal modification agents as shown in Table 1. The HPB (E) is a polybutadiene rubber prepared in the same manner as in the above Synthetic Example 1, except for using a reduced amount of methyl almoxane (from the 18.5mmol in Synthetic Example 1 to 6.0mmol) The polybutadiene rubber HPB (E) is a modified polybutadiene rubber with a large Mw/Mn of 5.1.

An unmodified polybutadiene rubber (D) (PB (D)) was prepared in the same manner as in Synthetic Example 1, except that no terminal modification agent was used.

The properties of these modified and unmodified polybutadiene rubbers, as well as the properties of a conventional high cis-1,4-polybutadiene rubber (BR11™, manufactured by JSR Corporation) are shown in Table 1.

TABLE 1

| Polybutadiene rubber | HPB(A) | HPB(B) | HPB(C) | HPB(D) | HPB(E) | High cis-1,4 BR (BR11) |
|---|---|---|---|---|---|---|
| Polymerization conditions | | | | | | |
| Catalyst | Nd-type | Nd-type | Nd-type | Nd-type | Nd-type | Ni-type |
| Modification agent | Sn | Sn | MDI | Unmodified | Sn | Unmodified |
| Properties | | | | | | |
| Mooney viscosity | 45 | 44 | 47 | 45 | 46 | 43 |
| Cis-1,4-bond content | 97.8 | 97.1 | 97.5 | 97.6 | 97.4 | 96 |

TABLE 1-continued

| Polybutadiene rubber | HPB(A) | HPB(B) | HPB(C) | HPB(D) | HPB(E) | High cis-1,4 BR (BR11) |
|---|---|---|---|---|---|---|
| 1,2-Vinyl bond content | 1 | 1.1 | 0.9 | 1 | 1.2 | 2.5 |
| Mw/Mn | 2.1 | 2.7 | 3.0 | 2.8 | 5.1 | 4.7 |

BR11: Trademark of polybutadiene rubber manufactured by JSR Corp.
Sn: Dioctyl tin bisoctylmaleate
MDI: A polymeric-type diphenylmethane diisocyanate Examples 1–8 and Comparative Examples 1–3

The polybutadiene rubbers shown in Table 1 were blended with zinc diacrylate, zinc oxide, dicumyl peroxide, and an antioxidant in the proportion shown in Table 2. The mixtures were kneaded to produce rubber compositions, which were molded by cross-linking for 30 minutes under pressure at 150° C. to obtain cores with a diameter of 38.5 mm.

A composition comprising 100 parts by weight of an ionomer resin (Sahrin™, manufactured by DuPont) and 2 parts by weight of titanium dioxide was coated by injection molding over the cores, thereby forming the cover for the cores. Two-piece solid golf balls with an external diameter of 42.7 mm were thus fabricated.

The golf balls for Comparative Examples 1 and 2 were prepared from a modified polybutadiene rubber (E) (HPB (E)) which is a polybutadiene rubber polymerized using a neodymium-type catalyst and modified with a terminal modification agent, but has a broad molecular weight distribution (Mw/Mn=5.1). The golf ball of Comparative Example 3 is a conventional standard two-piece solid golf ball prepared using a conventional high cis-1,4-polybutadiene rubber (BR11™, manufactured by JSR Corporation).

The weight, compression (in terms of PGA), initial ball velocity, shot run distance, and hammering durability were measured for these two-piece solid golf balls. The results are shown in Table 2. The shot feeling for these golf balls was evaluated by 10 professional golfers with a shot using a No. 1 wooden golf club. The results are also shown in Table 2.

The following methods were applied to the evaluations of initial ball velocity, shot run distance, hammering durability, and shot feeling.

(1) Initial ball velocity

The initial ball velocity (m/second) was measured, when the ball was hit by a swing robot made by True Temper Co. with a No. 1 wooden club at a head speed of 45 m/second.

(2) Shot run distance

The distance (yards) to the drop point was measured, when the ball was hit by a swing robot made by True Temper Co. with a No. 1 wooden club at a head speed of 45 m/second.

(3) Hammering durability

The ball was caused to repeatedly collide with an impact plate at the speed of 45 m/second. The number of collisions before the ball was broken was counted. The hammer ring durability in Table 2 is indicated by the index versus the number of collisions of the ball for Comparative Example 3 (=100).

(4) Evaluation of shot feeling

The shot feeling was evaluated by 10 professional golfers. The shot feeling of the test golf balls was compared with the golf ball of Comparative Example 3 which is the typical conventional two-piece solid golf ball.

The following evaluation standard was applied.

○: The shot feeling is soft and better than the golf ball of Comparative Example 3.

Δ: The shot feeling is equivalent to the golf ball of Comparative Example 3.

×: The shot feeling is hard and worse than the golf ball of Comparative Example 3.

The evaluation result (○, Δ or ×) was given only when at least 8 panelist professional golfers out of 10 provided the same evaluation result.

TABLE 2

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Polybutadiene rubber | | | | | | | | | | | |
| HPB (A) | 100 | 60 | | | | | | | | | |
| HPB (B) | | | 100 | 60 | | | | | | | |
| HPB (C) | | | | | 100 | 60 | | | | | |
| PB (D) | | | | | | | 100 | 60 | | | |
| HPB (E) | | | | | | | | | 100 | 60 | |
| BR11 | | 40 | | 40 | | 40 | | 40 | | 40 | 100 |
| Zinc diacrylate | 25 | 25 | 25 | 25 | 25 | 25 | 25 | 25 | 25 | 25 | 25 |
| Zinc oxide | 22 | 22 | 22 | 22 | 22 | 22 | 22 | 22 | 22 | 22 | 22 |
| Dicumyl peroxide | 1.8 | 1.8 | 1.8 | 1.8 | 1.8 | 1.8 | 1.8 | 1.8 | 1.8 | 1.8 | 1.8 |
| Antioxidant * | 0.5 | 0.5 | 0.5 | 0.5 | 0.5 | 0.5 | 0.5 | 0.5 | 0.5 | 0.5 | 0.5 |
| Weight (g) | 45.5 | 45.4 | 45.5 | 45.5 | 45.5 | 45.5 | 45.4 | 45.5 | 45.5 | 45.5 | 45.4 |
| Compression (PGA) | 90 | 90 | 91 | 90 | 91 | 90 | 91 | 90 | 89 | 90 | 90 |
| Initial ball velocity (m/sec) | 67.5 | 66.9 | 66.5 | 66.1 | 66.5 | 66.2 | 65.6 | 65.2 | 64.5 | 64.2 | 63.5 |
| Shot run distance (yard) | 236 | 234 | 233 | 231 | 233 | 232 | 230 | 228 | 226 | 225 | 222 |

TABLE 2-continued

|  | Example | | | | | | | | Comparative Example | | |
|---|---|---|---|---|---|---|---|---|---|---|---|
|  | 1 | 2 | 3 | 4 | 5 | 6 | 7 | 8 | 1 | 2 | 3 |
| Hammering durability ** | 153 | 144 | 141 | 138 | 140 | 137 | 132 | 126 | 119 | 115 | 100 |
| Shot feeling | ○ | ○ | ○ | ○ | ○ | ○ | Δ | Δ | ○ | ○ | — |

\* Antioxidant: Yoshinox ™, manufactured by Yoshitomi Pharmaceutical Co., Ltd.
\*\* An index versus the golf ball of Comparative Example 3 (=100)

The results in Table 2 show that the balls of Examples 1–8 had a longer shot run distance and were more durable than the balls of Comparative Examples 1 and 2. In addition, the balls of Examples 1–8 provided a more favorable shot feeling than the conventional standard two-piece solid golf ball of Comparative Example 3.

Examples 9–16 and Comparative Example 4–6

The components shown in Table 3 were kneaded by a kneader and a roller mill to obtain rubber compositions. The resulting rubber compositions were filled into a metal mold and molded by pressurized cross-linking molding for 25 minutes at 168° C. to obtain one-piece solid golf balls consisting of integrally molded articles with an external diameter of 42.7 mm.

The golf balls for Comparative Examples 4 and 5 were prepared from a modified polybutadiene rubber (E) (HPB (E)) which is a polybutadiene rubber polymerized using a neodymium-type catalyst and modified with a terminal modification agent, but has a broad molecular weight distribution (Mw/Mn=5.1). The golf ball of Comparative Example 6 is a conventional standard one-piece solid golf ball.

The weight, compression (PGA), initial ball velocity, shot run distance, and hammering durability were measured for these one-piece solid golf balls. The results are shown in Table 3. The shot feeling of the balls was compared with that of the conventional standard one-piece solid golf ball of Comparative Example 6. The results are shown in Table 3.

The results in Table 3 show that the balls of Examples 9–16 had a longer shot run distance and were more durable than the balls of Comparative Examples 4 and 5. In addition, the balls of Examples 9–16 provided a more favorable shot feeling than the conventional standard one-piece solid golf ball of Comparative Example 6.

The solid golf balls of the present invention provide a good shot feeling, run a long distance, and exhibit superior durability.

Obviously, numerous modifications and variations of the present invention are possible in light of the above teachings. It is therefore to be understood that within the scope of the appended claims, the invention may be practiced otherwise than as specifically described herein.

What is claimed as:

1. A rubber composition for solid golf balls comprising the following components (a), (b), (c), (d), and (e):
   (a) 50 to 100 parts by weight of a polybutadiene rubber with a 1,4-cis bond content of 80% or more, a 1,2-vinyl bond content of 2.0% or less, and a ratio (Mw/Mn) of the weight average molecular weight (Mw) and the number average molecular weight (Mn) of 3.5 or less;
   wherein said polybutadiene rubber is a modified polybutadiene rubber produced by polymerizing butadiene in the presence of rare earth catalyst, thereby obtaining a polymer; and
   reacting said polymer with a terminal modification agent;
   (b) 0 to 50 parts by weight of a diene-type rubber other than the component (a), provided that the total amount of the component (a) and component (b) is 100 parts by weight;

TABLE 3

|  | Example | | | | | | | | Comparative Example | | |
|---|---|---|---|---|---|---|---|---|---|---|---|
|  | 9 | 10 | 11 | 12 | 13 | 14 | 15 | 16 | 4 | 5 | 6 |
| Polybutadiene rubber |  |  |  |  |  |  |  |  |  |  |  |
| HPB (A) | 100 | 60 |  |  |  |  |  |  |  |  |  |
| HPB (B) |  |  | 100 | 60 |  |  |  |  |  |  |  |
| HPB (C) |  |  |  |  | 100 | 60 |  |  |  |  |  |
| PB (D) |  |  |  |  |  |  | 100 | 60 |  |  |  |
| HPB (E) |  |  |  |  |  |  |  |  | 100 | 60 |  |
| BR11 |  | 40 |  | 40 |  | 40 |  | 40 |  | 40 | 100 |
| Zinc diacrylate | 23 | 23 | 23 | 23 | 23 | 23 | 23 | 23 | 23 | 23 | 23 |
| Zinc oxide | 25 | 25 | 25 | 25 | 25 | 25 | 25 | 25 | 25 | 25 | 25 |
| Dicumyl peroxide | 0.6 | 0.6 | 0.6 | 0.6 | 0.6 | 0.6 | 0.6 | 0.6 | 0.6 | 0.6 | 0.6 |
| Weight (g) | 45.5 | 45.4 | 45.5 | 45.5 | 45.5 | 45.4 | 45.4 | 45.5 | 45.5 | 45.5 | 45.4 |
| Compression (PGA) | 81 | 80 | 81 | 80 | 81 | 81 | 81 | 80 | 78 | 80 | 90 |
| Initial ball velocity (m/sec) | 63.3 | 63 | 62.5 | 62.1 | 62.4 | 62.1 | 61.7 | 61.3 | 60.8 | 60.5 | 60 |
| Shot run distance (yard) | 222 | 221 | 219 | 217 | 218 | 217 | 216 | 215 | 213 | 212 | 210 |
| Hammering durability * | 152 | 147 | 144 | 141 | 144 | 140 | 136 | 131 | 119 | 114 | 100 |
| Shot feeling | ○ | ○ | ○ | ○ | ○ | ○ | Δ | Δ | ○ | ○ | — |

\* An index versus the golf ball of Comparative Example 6 (=100)

(c) 10 to 50 parts by weight of a crosslinking monomer;

(d) 20 to 80 part by weight of inorganic filler; and (e) an effective amount of an organic peroxide.

2. The rubber composition according to claim 1, wherein the ratio (Mw/Mn) of the weight average molecular weight (Mw) and the number average molecular weight (Mn) is 3.0 or less.

3. The rubber composition according to claim 1, wherein the terminal modification agent is at least one compound selected from the group consisting of:

(E) halogenated organometallic compounds, halogeno metallic compounds, or organometallic compounds represented by the following formulas:

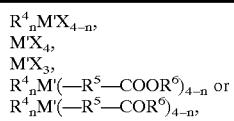

wherein $R^4$ and $R^5$ individually represent a hydrocarbon group containing 1–20 carbon atoms, $R^6$ is a hydrocarbon group containing 1–20 carbon atoms which may contain a carbonyl group or ester group in side chains, M' is a tin atom, silicon atom, germanium atom, or phosphorus atom, X is a halogen atom, and n is integer from 0 to 3;

(F) hetero cumulene compounds having a Y=C=Z bond in the molecule, wherein Y is a carbon atom, oxygen atom, nitrogen atom, or sulfur atom, and Z is an oxygen atom, nitrogen atom, or sulfur atom;

(G) 3 member heterocyclic compounds having the following bond in the molecule:

wherein Y is an oxygen atom, nitrogen atom, or sulfur atom;

(H) halogenated iso-cyano compounds;

(I) carboxylic acids, acid halides, ester compounds, carbonate compounds, or acid anhydrides represented by the following formulas:

$$R^7\text{---}(COOH)_m,$$
$$R^8(COX)_m,$$
$$R^9\text{---}(COO\text{---}R^{10}),$$
$$R^{11}\text{---}OCOO\text{---}R^{12},$$
$$R^{13}\text{---}(COOCO\text{---}R^{14})_m, \text{ or}$$

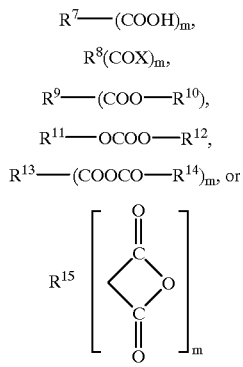

wherein $R^7$ to $R^{15}$ individually represent a hydrocarbon group containing 1–50 carbon atoms, X indicates a halogen atom, and m is an integer from 1 to 5; and (J) Metal salts of carboxylic acid represented by the following formulas:

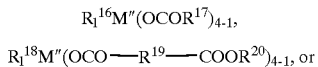

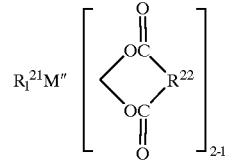

wherein $R^{16}$ to $R^{22}$ individually represent a hydrocarbon group having 1–20 carbon atoms, M" indicates a tin atom, silicon atom, or germanium atom, and l is an integer from 1 to 3.

4. The rubber composition according to claim 1, wherein the terminal modification agent is at least one compound selected from the group consisting of:

(E) halogenated organometallic compounds, halogeno metallic compounds, or organometallic compounds of the following formulas:

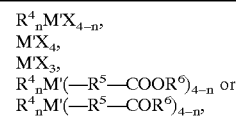

wherein $R^4$ and $R^5$ individually represent a hydrocarbon group containing 1–20 carbon atoms, $R^6$ is a hydrocarbon group containing 1–20 carbon atoms which may contain a carbonyl group or ester group in side chains, M' is a tin atom, silicon atom, germanium atom, or phosphorus atom, X is a halogen atom, and n is integer from 0 to 3;

(F) hetero cumulene compounds having a Y=C=Z bond in the molecule, wherein Y is a carbon atom, oxygen atom, nitrogen atom, or sulfur atom, and Z is an oxygen atom, nitrogen atom, or sulfur atom; and (J) Metal salts of carboxylic acid represented by the following formulas:

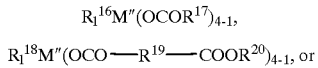

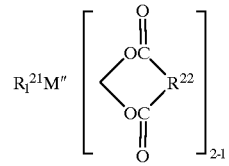

wherein $R^{16}$ to $R^{22}$ individually represent a hydrocarbon group having 1–20 carbon atoms, M" indicates a tin atom, silicon atom, or germanium atom, and l is an integer from 1 to 3.

5. The rubber composition according to claim 1, wherein the component (a) is a polybutadiene rubber or a modified polybutadiene rubber produced by polymerization using a catalyst comprising a rare earth catalyst and an almoxane compound.

6. The rubber composition according to claim 5, wherein the rare earth catalyst is a lanthanum series rare earth catalyst.

7. The rubber composition according to claim 6, wherein the lanthanum series rare earth catalyst is a neodymium based catalyst.

8. A solid golf ball of which the whole or part of rubbery material is produced by cross-linking and molding the rubber composition according to claim 1.

* * * * *